United States Patent

Schenk et al.

Patent Number: 6,014,860
Date of Patent: Jan. 18, 2000

[54] AIR SUPPLY ARRANGEMENT FOR AN INTERNAL COMBUSTION ENGINE

[75] Inventors: Jürgen Schenk, Albershausen; Udo Weist, Walddorfhäslach; Lothar Welter, Ostfildern; Hans-Christoph Wolf, Stuttgart, all of Germany

[73] Assignee: DaimlerChrysler AG, Stuttgart, Germany

[21] Appl. No.: 09/115,887

[22] Filed: Jul. 15, 1998

[30] Foreign Application Priority Data

Jul. 18, 1997 [DE] Germany ............... 197 30 905

[51] Int. Cl.<sup>7</sup> .............................. F01N 3/00
[52] U.S. Cl. .................. 60/286; 60/289; 60/290; 60/293; 123/41.59
[58] Field of Search ............. 60/289, 290, 286, 60/276, 293; 23/41.58, 41.59

[56] References Cited

U.S. PATENT DOCUMENTS

| | | | |
|---|---|---|---|
| 1,491,584 | 4/1924 | Connor | 123/41.59 |
| 1,873,379 | 8/1932 | Frentzel | 123/41.59 |
| 2,248,544 | 2/1941 | Maruhn | 123/27 |
| 3,034,290 | 5/1962 | Gary | 60/289 |
| 3,393,668 | 7/1968 | Milgram | |
| 4,491,094 | 1/1985 | Ogawa | |
| 5,095,691 | 3/1992 | Yoshimura et al. | |

FOREIGN PATENT DOCUMENTS

| | | |
|---|---|---|
| 1 476 110 | 8/1969 | Germany . |
| 90 11 256 | 10/1990 | Germany . |
| 5612012 | 10/1979 | Japan .......... 60/289 |

*Primary Examiner*—Thomas Denion
*Assistant Examiner*—Binh Tran
*Attorney, Agent, or Firm*—Klaus J. Bach

[57] ABSTRACT

In an air supply arrangement for an internal combustion engine, particularly for motor vehicles having devices for cooling the engine and for supplying exhaust gas secondary air to the exhaust system of the engine, a single air pump driven by an electric motor is provided for supplying air to the engine cooling system and to the exhaust system and devices for switching the air flow supplied by the air pump to either the engine cooling system or the engine exhaust system are provided. A control unit is also provided which controls the electric motor depending on the amount and pressure of the air needed for the cooling system and the engine exhaust system.

1 Claim, 1 Drawing Sheet

AIR SUPPLY ARRANGEMENT FOR AN INTERNAL COMBUSTION ENGINE

BACKGROUND OF THE INVENTION

The invention relates to an air supply arrangement for an internal combustion engine with means for cooling the engine and means for supplying secondary air to the exhaust gas of the engine, particularly for use in motor vehicles.

An internal combustion engine with such an air supply arrangement is shown, for example in U.S. Pat. No. 5,095,591. The arrangement described therein includes an engine fan and an exhaust gas secondary air pump each of which is driven by a hydraulic motor. The hydraulic motors have a common hydraulic fluid supply system which is however only large enough to provide for alternate operation of the hydraulic motors.

U.S. Pat. No. 3,393,668 discloses an exhaust gas catalytic converter in which a secondary air supply pump and an impeller in the catalytic converter are driven by a common electric motor. In that arrangement, the secondary air supply pump and the electric motor form a common structure.

German DOS 1 476 110 discloses an internal combustion engine unit for motor vehicles which includes a central electric motor which operates at constant speed, and drives mechanically several auxiliary units, particularly fluid pumps and an engine cooling fan.

U.S. Pat. No. 4,491,094 discloses a fan for motor vehicle engines which is driven by an electric motor whose motor shaft drives also a vacuum pump for a braking system. Upon operation of the electric motor, the fan as well as the vacuum pump are in operation, the vacuum applied to the pneumatic devices being controllable by means of a pneumatic control element.

It is the object of the present application to provide an internal combustion engine arrangement wherein the engine cooling air and the exhaust gas secondary air supply is realized with particularly simple means.

SUMMARY OF THE INVENTION

In an air supply arrangement for an internal combustion engine, particularly for motor vehicles having means for cooling the engine and means for supplying exhaust gas secondary air to the exhaust system of the engine, a single air pump driven by an electric motor is provided for supplying air to the engine cooling means and to the exhaust system and means for switching the air flow supplied by the air pump to either the engine cooling system or the engine exhaust system are provided. A control unit is also provided which controls the electric motor depending on the amount and pressure of the air needed for the cooling system and the engine exhaust system.

In this internal combustion engine arrangement, the ambient air is inducted by a central air pumping unit and is supplied to the engine cooling system as well as to an exhaust gas catalytic converter. The operation of the central air pump is alternating in such a way that either air for the engine cooling or air for the exhaust gas secondary air supply is provided. The air pumping unit is preferably so designed that its pumping volume and its pumping characteristic is adapted to the respective operation, that is, so that it fulfills the requirements for engine cooling on one hand, and for supplying exhaust gas secondary air to the exhaust gas system on the other.

A preferred embodiment of the invention will be described below on the basis of the accompanying drawings.

BRIEF DESCRIPTION OF THE DRAWINGS

The sole figure shows a block diagram of the most important components of the air pumping arrangement for a motor vehicle internal combustion engine according to the invention.

DESCRIPTION OF A PREFERRED EMBODIMENT

Figure 1:
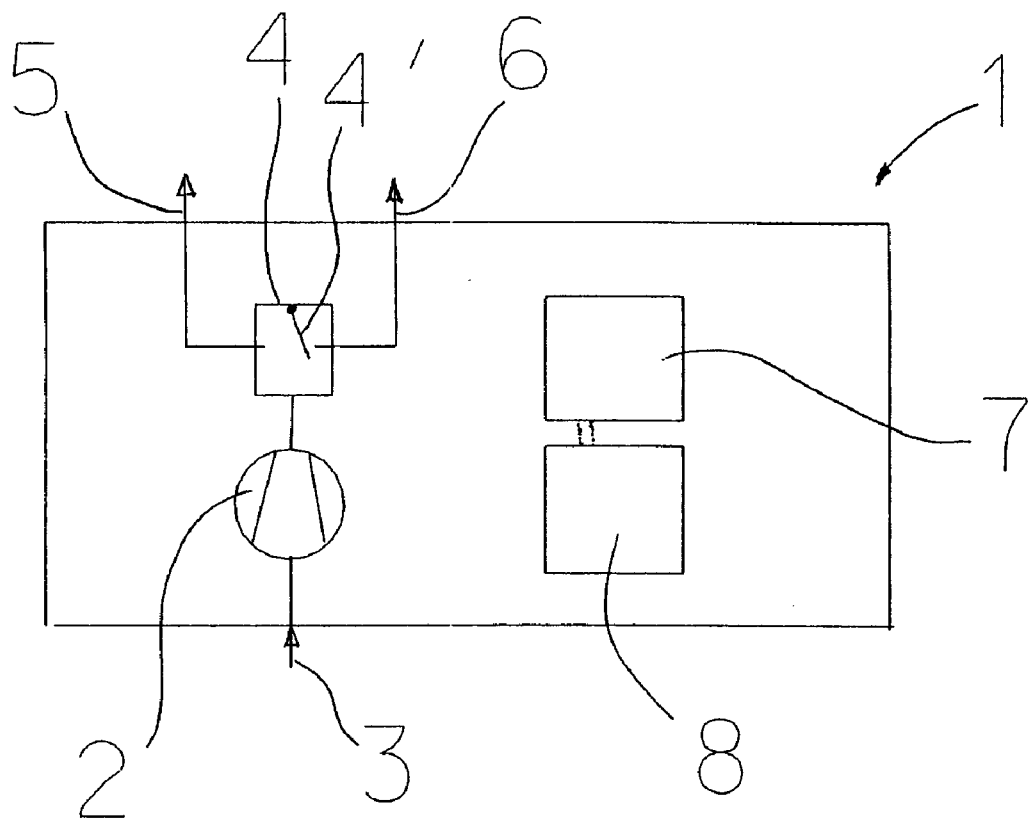

An internal combustion engine including an air pumping unit as shown in the figure includes, for example, a cooling water circuit for cooling the engine, which comprises an engine cooler to which engine cooling air is supplied. In addition, the the engine includes an exhaust gas pipe with an exhaust gas catalytic converter, particularly a 3-way catalytic converter. An exhaust gas secondary air supply for cold start operation of the engine is provided for the catalytic converter as the engine is operated during cold start-up periods with a rich fuel/air mixture so that the combustion in the engine is incomplete. In that case, there is insufficient oxygen in the exhaust gas which inhibits the desired catalytic oxidation of certain exhaust gas components. The added exhaust gas secondary air compensates for such a condition.

The exhaust gas secondary air requirements coincide during normal vehicle operation with an engine operating state in which engine cooling by the engine cooling water circuit is not needed. The invention utilizes this fact and combines the conventionally independent engine cooling fan unit and exhaust gas secondary air pump to a single air pumping unit as shown in FIG. 1. The air pumping unit comprises an air compressor 2 which inducts ambient air by way of an inlet 3 and compresses the ambient air up to a controllable degree whereupon it discharges the compressed air to a distribution chamber 4. The distribution chamber 4 includes a conventional switch-over valve 4', which is indicated schematically, by way of which the compressed air is supplied either to a first outlet 5 which leads to an engine cooler (not shown) or to a second outlet 6 for the exhaust gas secondary air supply. The air compressor 2 is driven by an electric motor 8, which is controlled by a control unit 7. In a modified embodiment, the air compressor may be driven directly by the engine crankshaft by way of a speed controlled clutch and/or a transmission.

During cold start-up operation of the internal combustion engine arrangement according to the invention, the switch-over valve 4' of the distribution chamber 4 is set in such a way that the air supplied by the air compressor 2 is supplied, by way of the outlet 6, to the exhaust gas system. The power output of the electric motor 8 is controlled, by the control unit 7 so that the air compressor 2 driven by the electric motor 8 provides an exhaust gas secondary air mass flow of appropriate pressure. At the same time, the air delivery characteristics of the air compressor 2, which is preferably adjustable is appropriately adapted such that, in this case, a relatively small air flow volume with relatively high pressure is generated.

As the oxygen content in the exhaust gas increases, the exhaust gas secondary air supply and consequently the output of the air compressor 2 can be reduced down to zero as long as the engine does not yet require cooling. As soon as it becomes necessary to cool the engine, the air compressor 2 is driven by the electric motor 8 again with increased power and the switchover valve 4' of the distribution chamber 4 is so adjusted that the air supplied by the air compressor 2 is conducted through the outlet 5 to the engine cooler. The speed of the electric motor 8 and the delivery volume of the air compressor 2 are then controlled depending on the cooling water temperature of the internal combustion engine. Since, for engine cooling, a relatively large amount of air at low pressure is needed, the adjustable delivery characteristic of the air compressor is changed accordingly. This may be supported by a funnel-like opening of the air passage leading to the engine cooler whereby the pressure of the air delivered by the air compressor is reduced.

With the arrangement according to the invention, one of the conventionally used units for generating air flows, that is, the engine cooling fan and the exhaust gas secondary air pump including an associated control device can be eliminated. This saves space and weight of the air supply system for the internal combustion engine. It is also advantageous with regard to the assembly of the engine as there are fewer parts which reduces costs. The arrangement according to the invention can be used in connection with various types of internal combustion engines and can be used in a flexible manner.

What is claimed is:

1. An air supply arrangement for an internal combustion engine, for motor vehicles having means for cooling the engine and means for supplying exhaust gas secondary air to an exhaust system connected to the engine, said arrangement including a single pump driven by a controllable drive means for supplying air to the engine cooling system and to the engine exhaust system, said arrangement including means for switching the air supplied by said air pump to any one of the engine cooing system and the engine exhaust system and a control unit for controlling said controllable drive means depending on the amount and pressure of the air needed for said cooling system and said engine exhaust system, respectively.

\* \* \* \* \*